US010414085B2

(12) United States Patent
Haubenschild et al.

(10) Patent No.: US 10,414,085 B2
(45) Date of Patent: Sep. 17, 2019

(54) CONTAINER AND BLOW MOLD

(71) Applicant: KHS Corpoplast GmbH, Hamburg (DE)

(72) Inventors: Jens-Uwe Haubenschild, Hamburg (DE); Arne Wiese, Ahrensburg (DE); Christian Rommel, Stockelsdor (DE)

(73) Assignee: KHS Corpoplast GmbH, Hamburg (DE)

( * ) Notice: Subject to any disclaimer, the term of this patent is extended or adjusted under 35 U.S.C. 154(b) by 0 days.

(21) Appl. No.: 15/551,235

(22) PCT Filed: Mar. 18, 2016

(86) PCT No.: PCT/EP2016/056048
§ 371 (c)(1),
(2) Date: Aug. 15, 2017

(87) PCT Pub. No.: WO2016/150880
PCT Pub. Date: Sep. 29, 2016

(65) Prior Publication Data
US 2018/0029282 A1   Feb. 1, 2018

(30) Foreign Application Priority Data

Mar. 20, 2015   (DE) ........................ 10 2015 003 514

(51) Int. Cl.
*B65D 1/02*   (2006.01)
*B65D 79/00*   (2006.01)
(Continued)

(52) U.S. Cl.
CPC .......... *B29C 49/4802* (2013.01); *B29C 49/08* (2013.01); *B29C 49/48* (2013.01);
(Continued)

(58) Field of Classification Search
CPC .... B65D 1/0246; B65D 1/023; B65D 1/0223; B65D 1/0276; B65D 1/0261;
(Continued)

(56) References Cited

U.S. PATENT DOCUMENTS 3,105,765 A * 10/1963 Creegan .................. B65D 7/44
   220/624
4,465,199 A   8/1984 Aoki
(Continued)

FOREIGN PATENT DOCUMENTS

EP   2703307 A1   3/2014
EP   2764967 A1   8/2014
(Continued)

*Primary Examiner* — Robert J Hicks
(74) *Attorney, Agent, or Firm* — Rankin, Hill & Clark LLP

(57) ABSTRACT

The invention relates to a container (1) for receiving a liquid content, comprising a container wall (10) which surrounds a container interior (12) and comprises an opening (8). The container wall has an opening region (2) at the opening, a base region (4) arranged opposite the opening region, and a lateral region (3) which extends between the opening region and the base region, and the container wall has a dimensionally stable central region (22) in the base region and a flexible flat region (24) which encircles the central region. The container wall transitions from the central region into the flat region at an angle such that an edge (26) which encircles the central region is formed in the container wall between the central region and the flat region. The invention further relates to a blow mold (31) for producing such a container.

19 Claims, 4 Drawing Sheets

Figure 1:
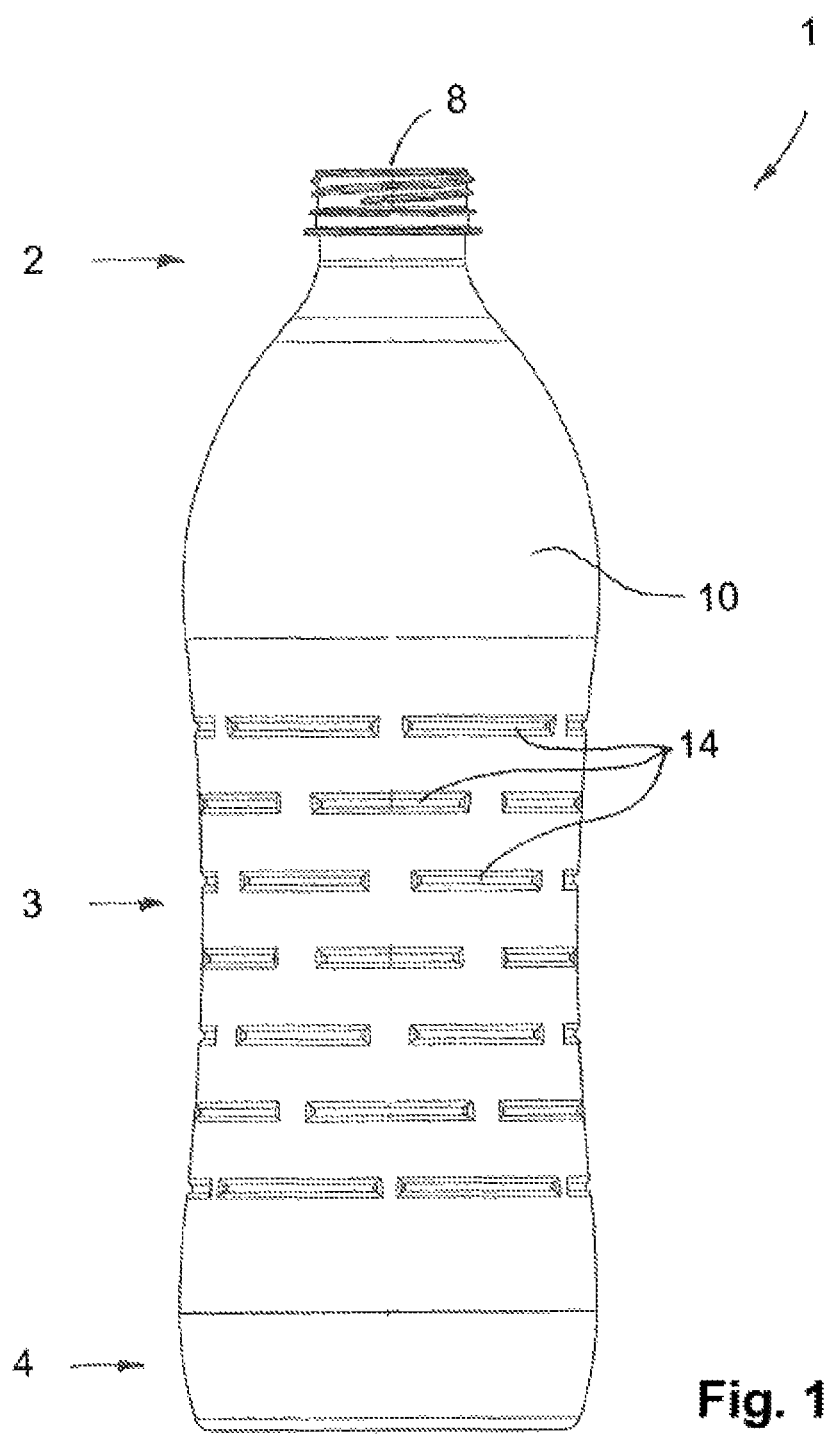

(51) Int. Cl.
  *B29C 49/48* (2006.01)
  *B29C 49/08* (2006.01)
  *B29L 31/00* (2006.01)
  *B29K 23/00* (2006.01)
  *B29K 67/00* (2006.01)
  *B29C 49/06* (2006.01)

(52) U.S. Cl.
  CPC ........ *B29C 49/4823* (2013.01); *B65D 1/0246* (2013.01); *B65D 1/0276* (2013.01); *B65D 79/005* (2013.01); *B29C 49/06* (2013.01); *B29C 2049/4828* (2013.01); *B29C 2049/4892* (2013.01); *B29K 2023/065* (2013.01); *B29K 2067/003* (2013.01); *B29L 2031/7158* (2013.01)

(58) Field of Classification Search
  CPC ... B65D 79/005; B29C 49/4802; B29C 49/08; B29C 49/48; B29C 49/4823; B29C 49/06
  USPC ........ 215/374, 373, 372, 371, 376, 382, 44; 220/608, 606, 605, 604, 623, 293, 288, 220/624; D9/520
  See application file for complete search history.

(56) References Cited

U.S. PATENT DOCUMENTS

| | | | |
|---|---|---|---|
| 5,392,937 A * | 2/1995 | Prevot | B65D 1/0223 215/396 |
| 5,906,286 A * | 5/1999 | Matsuno | B29C 49/12 215/373 |
| 6,153,145 A | 11/2000 | Desoutter et al. | |
| 8,794,462 B2 * | 8/2014 | Trude | B29C 49/08 215/370 |
| 2003/0196926 A1 * | 10/2003 | Tobias | B65D 1/0284 206/509 |
| 2004/0211746 A1 * | 10/2004 | Trude | B65D 1/0276 215/374 |
| 2005/0196569 A1 | 9/2005 | Lisch et al. | |
| 2007/0187355 A1 * | 8/2007 | Kamineni | B65D 1/0223 215/384 |
| 2007/0215571 A1 | 9/2007 | Trude | |
| 2008/0173613 A1 * | 7/2008 | Ross | B65D 1/0223 215/379 |
| 2010/0232732 A1 | 9/2010 | Matthiesen et al. | |
| 2011/0017700 A1 | 1/2011 | Patcheak et al. | |
| 2012/0037645 A1 | 2/2012 | Boukobza | |
| 2014/0291280 A1 | 10/2014 | Miura et al. | |
| 2017/0057724 A1 * | 3/2017 | Bates | B65D 21/0231 |

FOREIGN PATENT DOCUMENTS

| | | |
|---|---|---|
| EP | 2957515 A1 | 12/2015 |
| FR | 2966130 A1 | 4/2012 |
| WO | 2004028910 A1 | 4/2004 |

* cited by examiner

CONTAINER AND BLOW MOLD

The invention relates to a container for receiving a liquid content, comprising a container wall which surrounds a container interior and comprises an opening, wherein the container wall has an opening region at the opening, a base region arranged opposite the opening region, and a lateral region which extends between the opening region and the base region.

The invention further relates to a blow mold for producing a container.

In the case of containers for liquids, in particular in light-weight containers made of plastic, there is generally a requirement that the external appearance as well as the stability of the container are not appreciably affected even in the case of temperature fluctuations and corresponding volume changes of the content which lead to a change in the internal pressure in the container. The containers are typically designed in such a way that the container walls are sufficiently dimensionally stable.

The stabilization of the container's dimensions against negative pressure in the container with respect to the surroundings which can arise, for example, during cooling of the filled container, has been found to be particularly problematic. If the container wall is not configured sufficiently dimensionally stable, for example by a dimensionally stabilizing contour and/or a sufficiently thick wall thickness, known containers tend to form undesirable deformations, for example in that a substantially cylindrical bottle assumes an oval cross-section. In order to avoid this, considerable restrictions have been imposed on the design of stable containers as far as dimensional freedom and/or possible material savings are concerned.

Further basic conditions, which must be taken into account in the design of a container, are, for example, the stability.

The object of the invention is to provide further design freedom in containers for liquid content, in particular with respect to dimensional freedom and possibilities for material savings, wherein the above-mentioned requirements for a container, in particular with regard to stability under negative pressure in the container, should still be met.

According to the invention, this object is achieved by a container for receiving a liquid content, comprising a container wall which surrounds a container interior and comprises an opening, wherein the container wall has an opening region at the opening, a base region arranged opposite the opening region, and a lateral region which extends between the opening region and the base region, wherein the container according to the invention is further developed in that the container wall has a dimensionally stable central region in the base region and a flexible flat region which encircles the central region, wherein the container wall transitions from the central region into the flat region at an angle such that an edge which encircles the central region is formed in the container wall between the central region and the flat region.

The flexible flat region thereby makes it possible for the container wall to deform in the base region and, as a result, the internal volume of the container is variable within certain limits in order to at least partially compensate a pressure difference to the surroundings.

For example, the flat region deforms towards the container interior under the effect of a negative pressure, so that the dimensionally stabilized central region in the base region of the container moves towards the opening region. This reduces the volume of the container interior and reduces the negative pressure in the container. Accordingly, the invention makes it possible to configure the container wall less stable, in particular in the lateral region of the container, by, for example, saving material in the wall thickness and/or dispensing with dimensionally stabilizing contours.

The lateral region of the container is preferably formed as a substantially vertical side wall. However, this does not preclude the lateral region from being able to include dimensionally stabilizing and/or styling contours.

The pressure difference which can be maximally compensated by means of the invention can be increased by filling the container under a positive pressure and closing it, so that, for example, upon cooling the filled content the positive pressure is reduced first before any negative pressure occurs in the container. In this case, it is also taken into account in the invention that the container wall in the flat region possibly bulges further than all other contours in the base region of the container, i.e., from the container interior beyond the standing bead of the container. In other words, the flat region is formed such that it can bulge out of the container interior beyond the standing bead of the container. The bulge of the flat region is preferably in the longitudinal direction of the container. In this case, which can occur in particular in the event of a positive pressure in the container, the bulged flat region forms a ridge which encircles the central region and is available as a standing ring for the container.

The flat region according to the invention is flexible in such a way that, even at relatively low positive pressure in the container, a bulge of the flat region and the formation of a standing ring by the flat region occur. In other words, the flexibility of the flat region allows the flat region can easily bulge out. "Positive pressure" means a pressure in the container interior which is above the pressure outside the container, "negative pressure" means a pressure in the container interior which is below the pressure outside the container. The pressure difference is the difference between the pressure inside the container and outside the container, with positive differential values indicating a positive pressure in the container interior. The flat region is formed in such a way that it bulges out of the container interior beyond the standing bead of the container and forming a standing ring even at a slight positive pressure in the container interior, i.e., for example in the case of a pressure difference between internal and external pressure of at least 0.05 bar, preferably of at least 0.2 bar. In other words, the flat region is formed in such a way that it is already bulges out at a low pressure difference between the internal and external pressure of the container, i.e., a pressure difference of 0.05 bar to 0.5 bar, preferably of 0.2 bar to 0.3 bar.

With increasing internal pressure and a correspondingly stronger bulge of the flat region, this ridge or standing ring shifts towards the central region. The diameter of the standing ring formed by the flat region thus becomes smaller with increasing pressure in the container. However, the dimensionally stable formation of the central region according to the invention and the edge according to the invention between the central region and the flat region ensure that a sufficiently large footprint is always available for a secure standing of the container.

The central area is substantially round and arranged centrally, i.e. in the middle, in the base region of the container. It has been found that a particularly good standing stability of the container is ensured if the diameter of the central region is about 25 to 75% of the diameter of the base region, preferably about 40 to 70%, more preferably about 50 to 65%. In other words, the diameter of the central region is preferably at least 25%, more preferably at least 40%, even more preferably at least 50% of the diameter of the base region. The size of the central area ensures that the size of the standing ring formed by the flat area is sufficient to ensure a stable standing of the container. In other words, the central region has a diameter which ensures that, with a maximum bulge of the flat region beyond the standing bead, a standing ring is formed which allows for a stable standing of the container.

It should be understood that the outer radius of the edge between the flat region and the central region substantially corresponds to the outer radius of the central region plus the thickness of the edge because the edge directly adjoins the central region. Therefore, the outer radius of the edge between the flat region and the central region corresponds to approximately half the diameter of the central region plus the thickness of the edge.

The diameter of the flat region is about 70 to 100%, preferably about 80 to 95%, of the diameter of the base region. The diameter of the flat region is measured as the diameter of the flat region, which contains the central region and the edge between the central region and the flat region. In other words, the diameter of the flat region is preferably at least 70%, more preferably at least 80% of the diameter of the base region.

It should be understood that the outer radius of the edge between the flat region and the standing bead substantially corresponds to the outer radius of the flat region plus the thickness of the edge, since the edge directly adjoins the flat region. Therefore, the outer radius of the edge between the flat region and the standing bead corresponds to about half the diameter of the flat region plus the thickness of the edge.

The invention is particularly suitable for containers the container wall of which comprises a thermoplastic material which has been provided as an injection-molded workpiece and has been transformed in producing the container by means of a hollow blow mold after suitable thermal conditioning by the application of a stretch blow molded body process. Suitable thermoplastic materials are in particular plastics from the class of polyesters, for example polyethylene terephthalate (PET), polyethylene naphthalate (PEN), polyethylene (PE), high density polyethylene (HDPE, from English: "high density polyethylene") or polypropylene (PP). In the field of beverage and household containers, PET is particularly advantageous, while in the medical field PP offers particular advantages. The use of HDPE has also proved successful for sensitive liquids such as milk and dairy products.

The edge between the central region and the flat region is formed in such a way that it limits the deformation of the base region. In particular, when the positive pressure in the container is low, a bulge of the central region towards the container exterior beyond a standing ring formed by the flat region is prevented.

An advantageous further development of the invention consists in that the edge between the central region and the flat region is formed in a bead-like manner. As a result, the container wall is further stabilized at the edge, which in turn effectively prevents the container wall from buckling on the edge under increasing positive pressure in the bottle and negatively impacting the overall stability of the base region. For example, the edge can be formed by a material thickening. This material thickening leads to a stiffening at the edge. Alternatively or additionally, the edge between the central region and the flat region can also be designed as a bend or as a step. In a preferred embodiment, the edge is designed as a bend. In this and other embodiments, the flat region and the central region abut one another at an angle.

It is also provided to form a standing bead encircling the flat region in the base region of the container wall. As a result, the base region is also stabilized against buckling on the side of the flat region lying opposite the central region. At the same time, the standing bead is available as a standing ring when the flat area is bulged towards the container interior. The standing bead forms the footprint for the container at normal pressure in the bottle.

In preferred embodiments, the base region consists of the central region, the flat region and the standing bead, the edge between the central region and the flat region, and optionally the edge between the flat region and the standing bead.

It is particularly preferred that the standing bead adjacently surrounds the flat region. This means that the flat region substantially adjoins directly to the standing bead, but does not exclude the possibility of an edge being formed between the standing bead and the flat region. The standing bead can be separated from the flat region by an edge, but can also be formed by the transition from the flat region into the lateral region of the container, i.e., the substantially vertical side wall. In one embodiment, the standing bead is formed by the transition of the flat region into the lateral region of the container. This means that the lateral region directly adjoins the flexible flat region, i.e., that the flat area and the side area transition into one another.

If the standing bead and the flat area are alternatively separated by an edge, the edge is formed as a bend or step. As used herein, "bend" means that the flat region and the standing bead (or the flat region and the central region) abut one another other at an angle. Preferably, the standing bead and the flat region are separated from one another by (not more than) one edge.

The height of the edge, i.e., the distance between the flat region adjoining the edge and the standing bead (or lateral region) or central region adjoining the edge can be small, since a small edge is already sufficient in order to stabilize the container against deformation beyond the flat region at normal pressure or low positive pressure. The height of the edge is, for example from 0 to 5 mm, preferably from 0 to 2 mm. In other words, the height of the edge is, for example less than 5 mm, preferably 2 mm or less.

If the standing bead is formed not only by the transition of the flat region into the lateral region but, for example, is separated from the flat area by an edge, the standing bead can, e.g., for the purpose of stiffening, be formed as a bead-like ridge on the outer surface and/or inner surface of the container wall in the base region. The bead-like ridge preferably has only a low height, for example a height of less than 8 mm, preferably less than 5 mm.

One aspect of the invention is, in particular, that the flat region is substantially more easily deformable compared to the central region.

A flexibility of the flat region, which is increased compared to the central region, is achieved, for example, by a low wall thickness of the container wall in the flat region. For this purpose, the container wall in the flat region preferably has a wall thickness of at most 0.25 mm, particularly preferably of at most 0.20 mm, and more preferably of at most 0.18 mm. In other words, the container wall in the flat region can have, e.g., a wall thickness of 0.05 mm to 0.25 mm, preferably of 0.05 to 0.20 mm or particularly preferably of 0.05 to 0.18 mm. These values are particularly suitable for container walls including or made of polyesters, wherein the wall thickness which is optimal in individual cases also depends on the specific material used.

A stability of the central region, which is increased compared to the flat region, is achieved, for example, by the fact that the container wall has a greater wall thickness in the central region than in the flat region.

Cumulatively or alternatively, the stability of the central region is improved if the container wall has a suitable dimensionally stabilizing contour in the central region. For example, the container wall has a bulge in the central region which is directed especially towards the container interior. Such a bulge is advantageously formed at least in sections in the form of a dome or a spherical cap. In addition, the central region can have further dimensionally stabilizing elements, such as, for example, ribs.

Deviating from an ideal dimensionally stabilizing contour in the middle of the central region, for example to be able to take into account the presence of an injection point when producing containers according to the invention from injection-molded workpieces or to achieve more stabilization in the middle region of the central region by a suitable contour, is not detrimental to the effect of this contour, which is aimed at according to the invention.

As described, sufficient stability and increased flexibility of the flat region compared to the central region can already be achieved by the dimensional stabilization of the central region. The flat region and the central region can therefore also have substantially the same wall thickness. Since the flexibility of the flat region can also compensate for larger pressure differences, according to the invention also particularly thin wall thicknesses are sufficient to produce relatively stable containers.

The flat region can also have a bulge, preferably a bulge which points into the interior of the container at normal pressure. The resultant slight dimensional stabilization of the flat region does not prevent the bulging of the flat region, but rather only enlarges the surface of the flat region that can bulge out. Thus the compensable pressure difference is further increased. The bulge can be formed at least in sections in the form of a dome which is interrupted by the central region and the edge between the central region and the flat region. Preferably, however, the flat region does not comprise any further dimensionally stabilizing structures, e.g., no ribs.

The object of the invention is also achieved by a blow mold for producing a container according to the invention, wherein the blow mold is formed as a hollow mold and predetermines a contour of the container wall of the container to be produced.

The blow mold according to the invention is advantageously formed in several parts, wherein the blow mold has in particular a base mold for predefining the contour of a base region of the container. The present invention also provides for such a base mold for a blow mold according to the invention on its own. The invention thus relates, in a further aspect, to a base mold for producing a container according to the invention.

The base mold substantially consists of a molded body which has molded body surfaces which define the contour of the container wall in the base region. The molded body has, in particular, molded body surfaces which define the contour of the central region, the flat region and the standing bead. In addition, the molded body has an edge contour which is suitable for shaping the edge between the central region and the flat region, and optionally a further edge contour which is suitable for shaping the edge between the flat region and the standing bead (or side wall).

The base mold is preferably integrally formed.

Figure 2A:
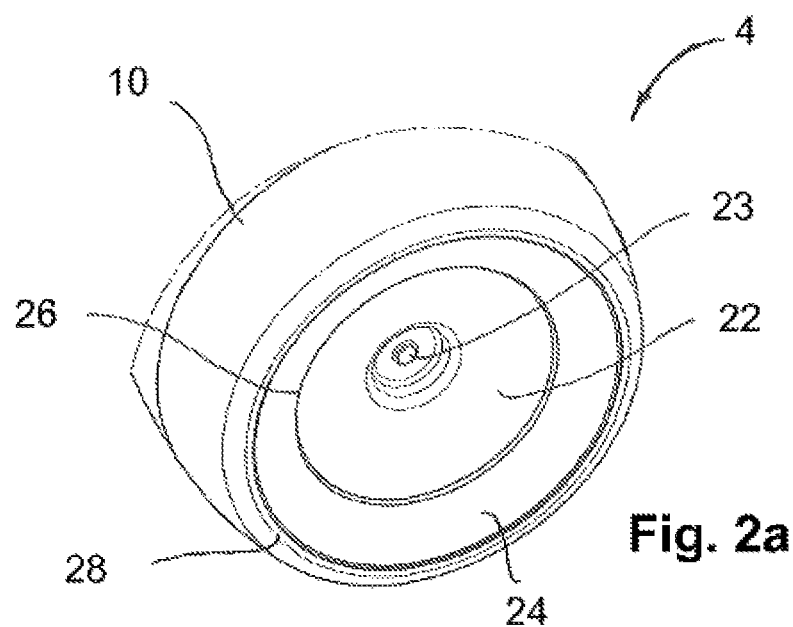
Figure 2B:
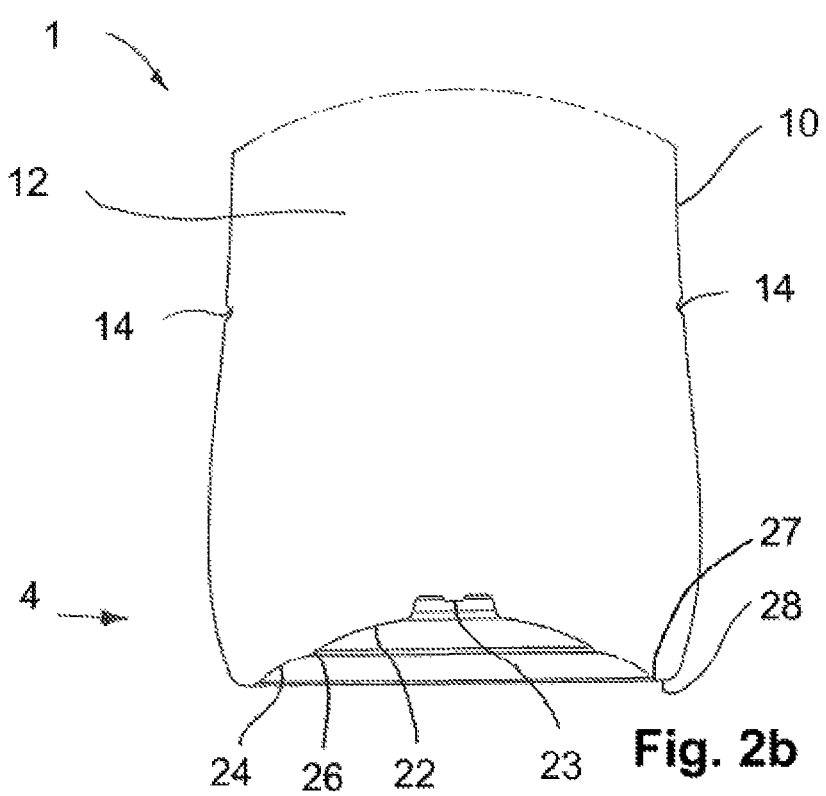
Figure 3A:
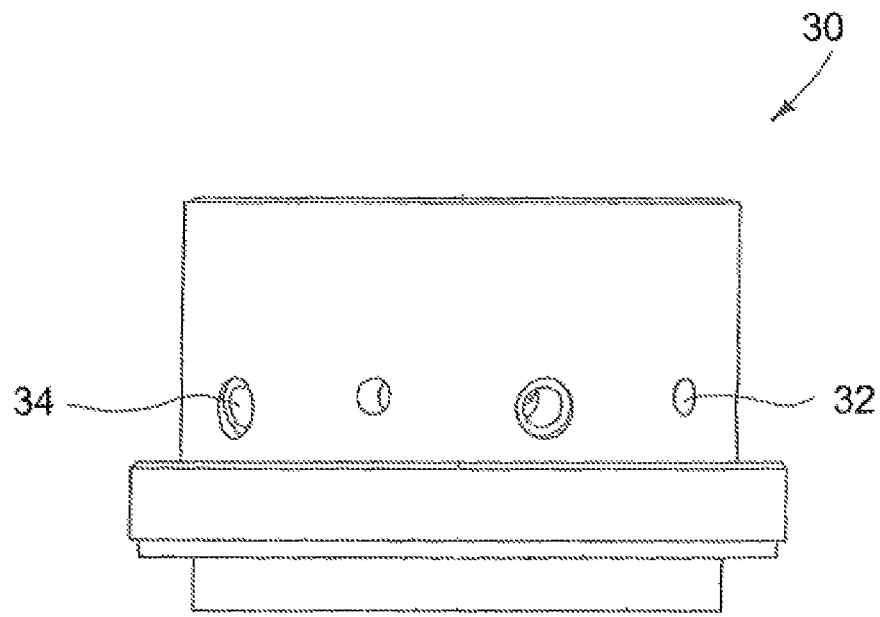
Figure 3B:
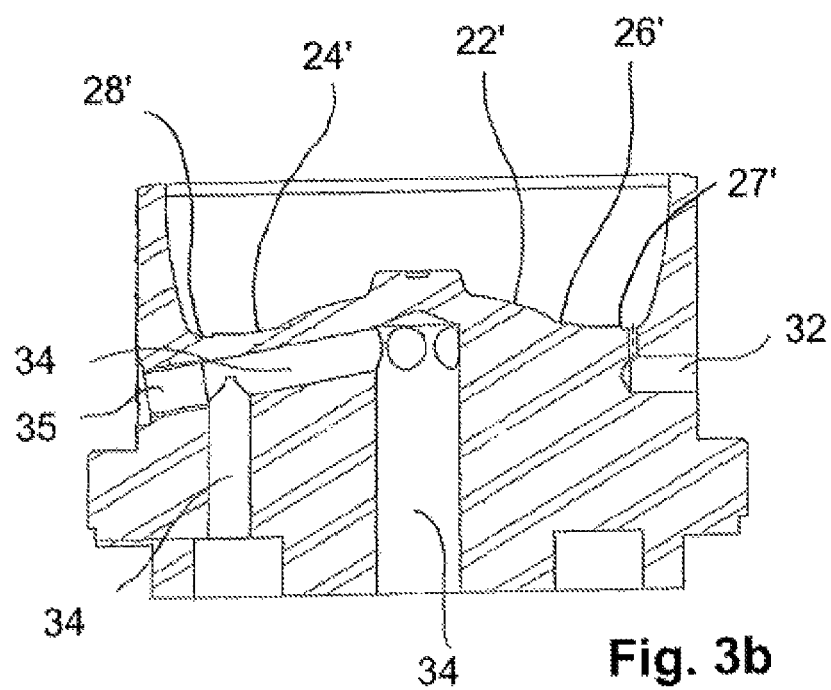
Figure 4:
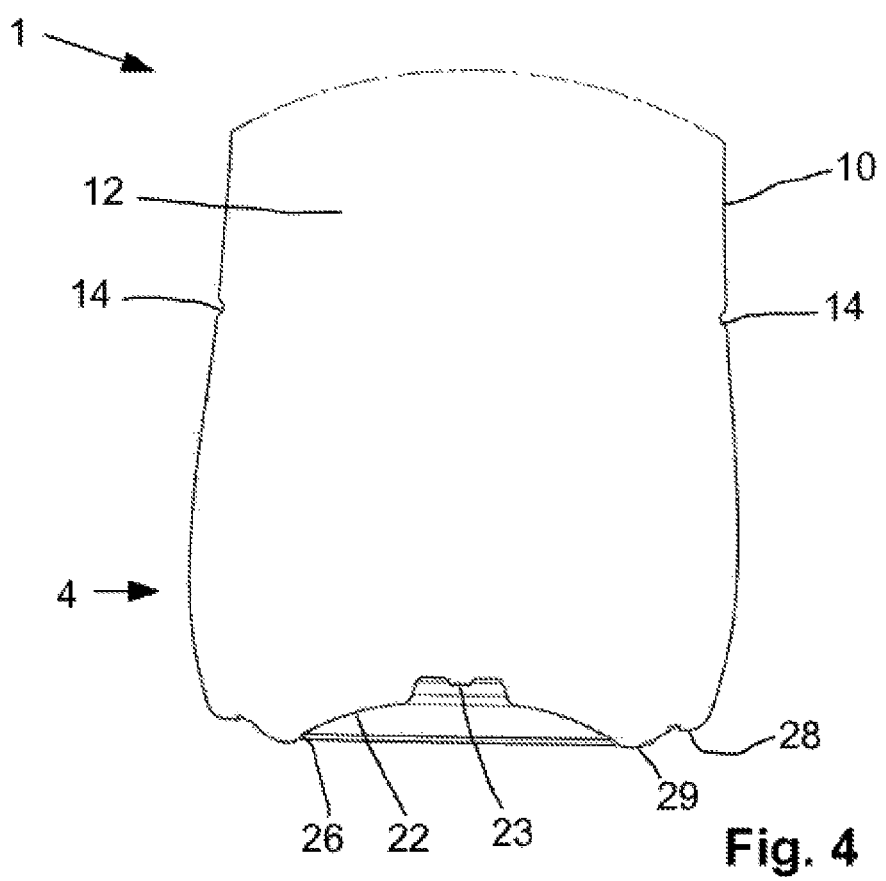

The invention is explained below without limiting the general idea of the invention by means of an exemplary embodiment with reference to the drawings. In the drawings:

FIG. 1 shows schematically an exemplary embodiment of a container according to the invention;

FIG. 2a schematically shows a perspective view of the base region of the container from FIG. 1, FIG. 2b schematically shows a sectional view of a part of the container shown in FIG. 1;

FIG. 3a shows schematically an exemplary embodiment of a base mold for a blow mold according to the invention;

FIG. 3b schematically shows a sectional view of the base mold for forming the base from FIG. 2a; and FIG. 4 schematically shows a sectional view of the part of the container depicted in FIG. 2b, wherein the flat region is bulged out.

FIG. 1 shows, by way of example, an exemplary embodiment of a container 1 according to the invention, which is formed as a bottle. Apart from an opening 2, the container 1 has a container wall 10, which is divided into an opening region 2 at the opening 8, a base region 4 and a lateral region 3 extending between the opening region 2 and the base region 4. In order to increase the surface stability, the container wall 10 has stabilization ribs 14 in the lateral region 3.

A perspective view of the base region 4 is shown schematically in FIG. 2a, a schematic sectional view of the lower part of the container 2 is shown in FIG. 2b.

The container wall 10 has a circular-symmetrical contour in the base region 4, which extends substantially concentrically around an injection point 23. The injection point 23 is a remnant of an injection-molded workpiece from which the container 1 was produced after thermal conditioning by means of a blow mold 31 in a stretch blow molded body process.

In the immediate vicinity of the injection point 23, the contour of the container wall 10 has a depression, which transitions into a bulged central region 22. In the central region 22, the container wall 10 is otherwise bulged and thus particularly dimensionally stable, wherein the depression around the injection point 23 is designed as far as possible in such a way that it supports or even improves dimensional stability. It is also conceivable to provide a comparatively large wall thickness or a comparatively thick container wall in the central region 22 for further stabilization.

Radially outside the central region 22, a flat region 24 is provided in the container wall 10, which encircles the central region 22. Within the scope of the invention, it is advantageous if the flat region 24 is oriented substantially concentrically around the central region 22. It is also advantageous if the central region 22 and the flat region 24 are formed to be rotationally symmetrical, in particular circular symmetrically within the usual production tolerances.

According to the invention, the flat region 24 is configured flexibly. For this purpose, it is provided in particular that an edge 26 is formed between the central region 22 and the flat region 24 in the container wall 10, against which the central region 22 and the flat region 24 abut one another at an angle. It may also be provided to configure the wall thickness of the container wall 10 in the flat region 24 comparatively thin. If the container wall consists substantially of PET, a wall thickness in the flat area 24 of about 0.16 mm has proved to be useful in practice for the container 1 shown. However, the person skilled in the art will take into account that this is a value optimized for a single exemplary embodiment of the invention from which it is possible to deviate within the scope of the invention, and in particular also depends on the material used.

According to experience, the wall thickness in the flat region 24 should not exceed 0.25 mm, wherein wall thicknesses of 0.2 mm or less have proved to be useful for a wide range of different containers, e.g. wall thicknesses of 0.18 mm or less.

In the bottle shown by way of example, the edge 26 is also formed as a reinforced bead, so that the edge forms a bending-resistant ring between the central region 22 and flat region 24. This increases the stability of the central region 22 and favors a deformation of the flat region 24 under pressure, since a flow of force from the flat region 24 to the central region 22 is deflected at the edge 26 and thereby interferes with a stabilizing support of the flat region 24 at the central region 22. Radially outside the flat region 24, a standing bead 28 is formed in the container wall 10, which adjacently surrounds the flat region 24 as a stabilized ring.

Overall, according to the invention, this results in a contour in which the annular flat region 24 extends between two comparatively stable rings and thus achieves a functionality similar to a rolling bellows, so that the dimensionally stabilized central region 22 can be moved when the flat region 24 is deformed.

In particular, the central region 22 can move upwards for volume reduction of the container interior 12 and downwards for a volume increase and thus at least partially compensate pressure differences occurring between the container interior 12 and the surroundings.

Typically, the container 1 formed as a bottle will thereby be standing securely on the annular standing bead 28. However, in the case of the present invention, the stability is also ensured if the flat region 24 bulges downwards beyond the standing bead 28 when the volume of the container interior 12 increases. In this case, an annular ridge results in the bulged out flat region 24, which however is in any case at least as big as the ring formed by the edge 26, and thus always provides sufficient footprint.

A bead-like stabilization of the edge and/or the presence of a standing bead 28 is advantageous for this mode of action according to the invention. The described mode of action of the base region according to the invention is, however, already achieved substantially when the inner ring is formed as a simple bend between the central region 22 and flat region 24 and the outer ring is formed by the transition of the flat region 24 into the substantially vertical side wall of the container.

In the bottle shown by way of example in FIG. 2b, the edge 27, i.e., the edge between the flat region 24 and the standing bead 28, is formed as a step so that the edge forms a bending-resistant ring between the flat region 24 and the standing bead 28. This increases the stability and favors a deformation of the flat region 24 under pressure, since a flow of force from the flat region 24 to the standing bead 28 is deflected at the edge 27 and thereby interferes with a stabilizing support of the flat region 24 at the standing bead 28.

FIG. 4 shows, by way of example, an exemplary embodiment of the container 1 according to the invention from FIG. 2b, wherein the flat region 24 is bulged out of the container interior in the longitudinal direction of the container 1 beyond the standing bead 28 by a volume increase of the container interior. The flat region 24 thereby forms a standing ring 29, which encircles the central region 22 or the edge 26 and can serve as a secure footprint for the container 1.

The central region 22 is formed dimensionally stabilized in the form of a dome and usually does not bulge out of the container interior.

According to the invention, there is also a base mold 30 by means of which the described base contour according to the invention of a container 1 can be produced or molded in the base region 4. An exemplary base mold 30 for molded body the base region 4 shown FIGS. 2a and 2b is shown in FIGS. 3a and 3b, wherein FIG. 3a shows a schematic side view and FIG. 3b shows a schematic sectional view.

The base mold 30 substantially consists of a molded body which is formed, for example, from a metal, such as aluminum or steel. Mold surfaces 22', 26' and 28' are provided in this molded body, which predefine the contour of the container wall in the base region 4, in particular of the central region 22, the flat region 24 and the standing bead 28. In addition, there is an edge contour 26' for molding the edge 26 between the central region 22 and the flat region 24. Advantageously, the edge contour 27' can also be provided, which serves molding the edge between the flat region and the standing bead.

In addition, the molded body has bores 34 for forming cooling passages as well as bores 32 for forming ventilation passages, wherein the bores 34 for the cooling channels are closed by a closure 35 on the outside.

REFERENCE NUMERALS

1 Container
2 Opening region
3 Lateral region
4 Base region
8 Opening
10 Container wall
12 Container interior
14 Stabilizing rib
22 Central region
22' Molding surface for the central region
23 Injection point
24 Flat region
24' Molding surface for the flat region
26 Edge
26' Mold contour for edge
27 Edge between the flat area and standing bead
27' Mold contour for edge between flat area and standing bead
28 Standing bead
28' Molding surface for standing bead
29 Standing ring
30 Base mold
31 Blow mold
32 Bore for venting passage
34 Bore for cooling passage
35 Closure

The invention claimed is:

1. A container for receiving a liquid, said container comprising a container wall which surrounds a container interior and comprises an opening, wherein the container wall has an opening region at the opening, a base region arranged opposite the opening region, and a lateral region which extends between the opening region and the base region, wherein, in the base region, the container wall has a dimensionally stable central region and a flat flexible region which encircles the central region, wherein the container wall transitions from the central region into the flexible region at an angle such that an edge which encircles the central region is formed in the container wall between the central region and the flexible region, wherein a standing bead is formed in the base region of the container wall outward of the flat flexible region, wherein the container wall in the flexible region is configured to bulge away from the container interior in response to positive pressure in the container such that the bulged flexible region forms a standing ring that extends longitudinally beyond the standing bead, and wherein the diameter of the standing ring becomes smaller with increasing positive pressure in the container.

2. The container according to claim 1, wherein the container wall comprises a thermoplastic material.

3. The container according to claim 1, wherein the container wall is formed in a bead along the edge.

4. The container according to claim 1, wherein the standing bead is in a form of a continuous ring which encircles the flexible region.

5. The container according to claim 1, wherein the container wall has a maximum wall thickness of 0.25 mm in the flexible region.

6. The container according to claim 1, wherein the container wall has a greater wall thickness in the central region than in the flexible region.

7. The container according to claim 1, wherein the container wall has a dimensionally stabilizing contour in the central region.

8. The container according to claim 7, wherein the dimensionally stabilizing contour is curved at least in sections.

9. The container according to claim 8, wherein the dimensionally stabilizing contour is a dome.

10. The container according to claim 8, wherein the dimensionally stabilizing contour is in the form of a spherical cap.

11. The container according to claim 1, wherein a diameter of the central region is within a range of 40 to 70% of a diameter of the base region.

12. The container according to claim 1, wherein the standing bead adjacently surrounds the flexible region or is separated from the flexible region only by an edge which annularly surrounds the flexible region.

13. A blow mold for producing a container according to claim 1, wherein the blow mold is a hollow mold having an inner surface that predetermines a contour of the container wall of the container.

14. The blow mold according to claim 13, wherein the blow mold is not formed in one piece, but rather is formed as several separate and distinct parts.

15. The blow mold according to claim 14, wherein one of the several separate and distinct parts is a base mold for predefining a contour of the base region of the container.

16. The blow mold according to claim 15, wherein the base mold has an edge contour.

17. The blow mold according to claim 15, wherein the base mold is formed in one piece.

18. The container according to claim 1, wherein the container wall has a maximum wall thickness of 0.20 mm in the flexible region.

19. The container according to claim 1, wherein the standing bead is formed at a transition of the flexible region into the lateral region of the container.

* * * * *